United States Patent [19]
Cooke et al.

[11] Patent Number: 5,725,929
[45] Date of Patent: Mar. 10, 1998

[54] REINFORCED WOOD

[75] Inventors: Leslie Cooke, Eugene, Oreg.; Kenneth J. KarisAllen, Nova Scotia, Canada

[73] Assignee: Fiber Technologies, Inc., Drain, Oreg.

[21] Appl. No.: 700,144

[22] Filed: Aug. 20, 1996

[51] Int. Cl.⁶ .............. B27M 1/08; B27M 3/00; B32B 5/26; B32B 21/08
[52] U.S. Cl. .............. 428/106; 52/730.7; 52/745.19; 144/351; 156/182; 156/264; 156/265; 156/299; 156/304.1; 156/307.7; 156/313; 428/114; 428/119; 428/292.4
[58] Field of Search .............. 52/730.7, 745.19; 156/182, 264, 265, 307.7, 313, 299, 304.1; 428/106, 114, 119, 292.4; 144/351

[56] References Cited

U.S. PATENT DOCUMENTS

| | | |
|---|---|---|
| Re. 33,703 | 10/1991 | Hasegawa. |
| 2,965,529 | 12/1960 | Bright. |
| 3,589,963 | 6/1971 | Jensen. |
| 3,730,797 | 5/1973 | Jensen. |
| 3,878,016 | 4/1975 | Sadashige. |
| 4,314,871 | 2/1982 | Weinstock et al.. |
| 4,536,427 | 8/1985 | Kohn. |
| 4,818,321 | 4/1989 | Shimizu et al.. |
| 4,846,923 | 7/1989 | Lines. |
| 4,931,124 | 6/1990 | Baum. |
| 5,002,105 | 3/1991 | Bodig. |
| 5,050,653 | 9/1991 | Brown. |
| 5,109,898 | 5/1992 | Schacht. |
| 5,332,461 | 7/1994 | Huesler. |
| 5,362,545 | 11/1994 | Tingley. |
| 5,456,781 | 10/1995 | Tingley. |
| 5,498,460 | 3/1996 | Tingley. |
| 5,547,729 | 8/1996 | Tingley. |
| 5,565,257 | 10/1996 | Tingley. |

OTHER PUBLICATIONS

Fax Transmittal from Web Joist Northwest Corporation, 5 pages, Apr. 19, 1993.

*Primary Examiner*—James C. Cannon
*Attorney, Agent, or Firm*—Fasth Law Firm

[57] ABSTRACT

The reinforced wood piece of the present invention includes a wood body having a first wood panel adhered to a second wood panel. The wood body has a bottom and a top so that the first wood panel is disposed at the top of the laminated wood body. A laminated stock piece is adhered to the wood body. A second laminated stock piece may be adhered to the top of the wood body if the first laminated stock piece is adhered to the bottom of the laminated wood body. Each laminated stock piece includes a plurality of wood members and a fiber reinforced composite sheet material that are intermittently glued to one another. The stock piece is glued to the wood body so that the fiber reinforced polymer composite sheet material is perpendicular to a neutral plane disposed between a compression zone and a tension zone of the wood body.

25 Claims, 5 Drawing Sheets

REINFORCED WOOD

TECHNICAL FIELD

The invention relates to wood that is reinforced with high performance composite sheet materials.

BACKGROUND AND SUMMARY OF THE INVENTION

Laminated wood is often used in structural applications because wood provides good load bearing characteristics. However, when a wood beam is subjected to a downwardly directed load, the wood panels in the lower half of the beam are subjected to tension forces and the wood panels in the upper half of the beam are subjected to compression forces. If the wood beam fails in the lower half (the tension zone) due to a very heavy load, the failure can be catastrophic. However, a failure in the upper half of the wood beam (the compression zone) is often a more benign mode of failure. It has been found that conventional laminated wood beams often fail in the tension zone when they are subjected to a very high load.

The reinforced wood of the present invention made be a solid wood piece, a solid beam or a glue laminated beam made from conventional solid lumber or engineered wood products (reconstituted lumber) having a first wood panel adhered to a second wood panel. The beam has a bottom and a top so that the first wood panel is disposed at the top of the laminated beam. A laminated stock piece may be adhered to the wood piece or wood beam in the tension zone or compression zone thereof. In an alternative embodiment, the first wood panel may have a cavity formed therein to receive reinforcing members attached therein.

The stock pieces may include a plurality of wood members and fiber reinforced composite sheet materials that are intermittently glued to one another. The laminated stock pieces may have finger joints or be made of engineered wood. The laminated stock pieces may be glued to the wood piece so that the fiber reinforced composite sheet materials are perpendicular to a neutral plane that is formed between the tension zone and the compression zone of the wood piece. A second laminated stock piece may be glued to the first laminated stock piece so that the finger joints of the first laminated stock piece, preferably, are remote from the finger joints of the second laminated stock piece or with other adjacent laminated stock pieces. In an alternative embodiment, the top wood panel or the bottom wood panel may have a cavity formed therein to receive a reinforcing member therein.

The reinforced wood of the present invention provides excellent load bearing characteristics partly due to the novel employment of reinforcements.

DETAILED DESCRIPTION

Figure 1:
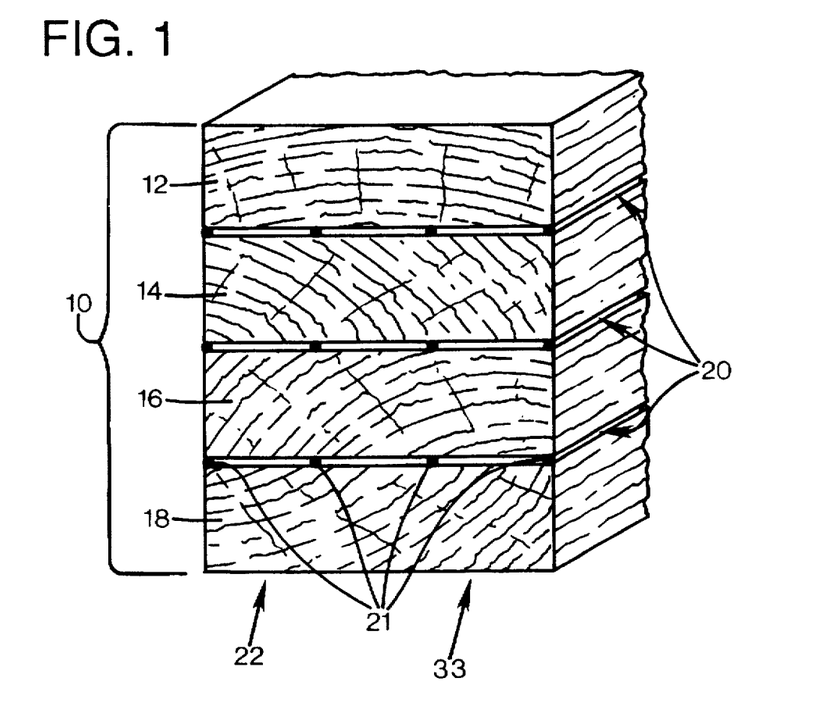
FIG. 1 is a perspective view of a wood stock of the present invention.

With reference to FIGS. 1-10, preferred embodiments of the present invention are shown. FIG. 1 shows a laminated wood stock 10 including a plurality of wood members 12, 14, 16, 18 stacked on top of one another. The wood stock 10 may include more or less than four wood members. The wood members may be made of the same or different wood species including, but not limited to, Douglas Fir, Hem Fir, Spruce Pine Fir, Southern Pine and Redwood. It is to be understood that engineering lumber produced from wood veneers or strands of wood that are subsequently bonded together may also be used as wood members such as laminated veneer lumber and laminated strand lumber.

High performance fiber reinforced composite sheet materials 20 may be placed between each of the wood members 12, 14, 16, 18 so that the wood members are separated by the sheet materials and the wood members and the sheet materials are aligned and stacked on top of one another in an alternating manner. The sheet materials 20 may include spaced apart strips 21 made of a material that is easy to cut, as explained in detail below.

The sheet materials 20 may be reinforced with such high performance materials as polyacrylonitrile (PAN) and pitch based carbon fiber, aramid fiber, high performance polyethylene fibers and conventional E/S-type glass fibers. The sheet materials 20 are preferably reinforced with low or medium modulus carbon fibers due to the moderate cost of these fibers and the fibers provide adequate properties for most structural applications. In the preferred embodiment, carbon fibers such as Akzo/Fortafil 3(C), Toray T-700, Grafil 34-700 and Toho Besfight G30-700 may be used. Other suitable fibers may also be used. The tensile strength of the carbon fiber should be between 400–800 ksi and most preferably between 500–700 ksi. The tensile modulus of the carbon fiber should be about 30–35 msi. Carbon fibers having higher or lower tensile strength and modulus properties may also be used depending on the particular application of the invention.

A variety of fiber architectures in the sheet materials may be used including woven, braided and knitted fabric and random mat and unidirectional fibers. Preferably, the carbon fibers are unidirectional in the longitudinal direction of the sheet materials. Although a combination of high performance fibers may used, carbon fiber is the preferred reinforcement due to the excellent stiffness properties of this fiber type.

Carbon and glass fiber reinforced composite sheet materials are abrasive to cutting tools and require the use of specially hardened cutting surfaces that are expensive to obtain. Therefore, the strips 21, made of a material that is not harmful to the cutting blade, may be included in the sheet materials 20 and placed alongside the reinforcement fibers to extend along the length of the sheet materials. The strips 21 may have a width that is equivalent to or greater than a cutting width made by the blade of a cutting saw. This prevents the cutting surfaces of a saw and planer from contacting the unidirectional reinforcement fibers. Aramid fiber may be a suitable material for the strips. Other protective materials may also be used.

The resin matrix of the fiber reinforced composite sheet material should preferably be epoxy, vinylester, polyester or possibly thermoplastic resin systems that can be bonded to wood. Epoxy resin is the preferred resin matrix because it provides for an efficient translation of fiber properties into the structural performance of the laminate. The sheet materials may be based on an impregnated or an un-impregnated material system.

The wood members 12, 14, 16 and 18 may have a thickness ranging from about ¼ inch to about 5 inches. Preferably, the thickness of the wood members is about 1–2 inches. The thickness of the sheet materials 20 may range from about 10 thousands of an inch to about ¼ inch. Preferably, the sheet materials 20 have a thickness of about 50 thousands of an inch.

A wide variety of glues may be used to glue the sheet materials 20 to the wood members. Suitable glue systems include, but are not limited to, emulsion polymer isocyanate, phenol-resorcinol, polyurethane, melamine and epoxy glues. Preferably, isocyanate glues are used because they provide excellent structural bonding between the sheet materials and the wood members. Phenol-resorcinol based glue systems are preferred for bonding wood to wood.

The surfaces of the wood members 12, 14, 16 and 18 and the fiber reinforced sheet materials 20 should be clean prior to gluing the sheet materials to the wood members. The surfaces of the sheet materials are treated to clean and prepare the surfaces for bonding. To enhance the bonding between the sheet materials and the wood members, the wood members should be recently planed prior to bonding so that the surfaces of the wood members and the sheet materials are relatively free from grease, excessive dust and imperfections. When a wood member is stored, a microscopic skin layer may form on the surface thereof which inhibits the bonding of the wood members to the carbon fiber reinforced composite sheet materials. It is therefore desirable to bond or attach the sheet materials to the wood members before the skin layer is formed or to remove the skin layer prior to bonding.

Figure 2:
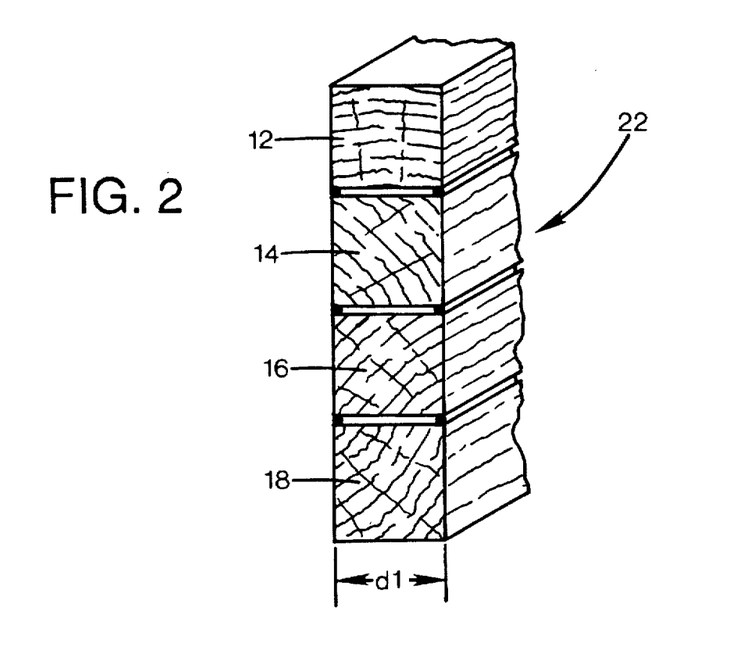
FIG. 2 is a perspective view of a stock piece of the present invention.

The glue laminated wood stock 10 may be vertically cut into a plurality of laminated reinforced stock pieces 22. A detailed view of stock piece 22 is shown in FIG. 2. Preferably, the thickness of the stock piece is adapted so that the cutting blade cuts into the strips 21 without having to be exposed to the abrasive carbon fibers of the sheet materials. The cut may be aligned with the longitudinal direction of the wood members and the sheet materials. The thickness d1 of the laminated stock piece 22 (best seen in FIGS. 2 and 3) may range from about ¼ to about 12 inches. Preferably, the thickness d1 is about 1–2 inches. The width W of the stock pieces 22 may range from about 2 to about 30 inches. Preferably, the width W ranges from 3.5–12 inches.

The stock piece 22 is preferably planed and turned from a vertical position (see FIG. 2) to a horizontal position (see FIG. 3) so that a planed surface 25 of the stock piece 22 may be attached, such as by using a glue, to a bottom surface 23 of a wood body 24. It is to be understood that the wood body 24 may be constructed of multiple solid wood members or engineered wood members or be a solid body that is not laminated.

Figure 3:
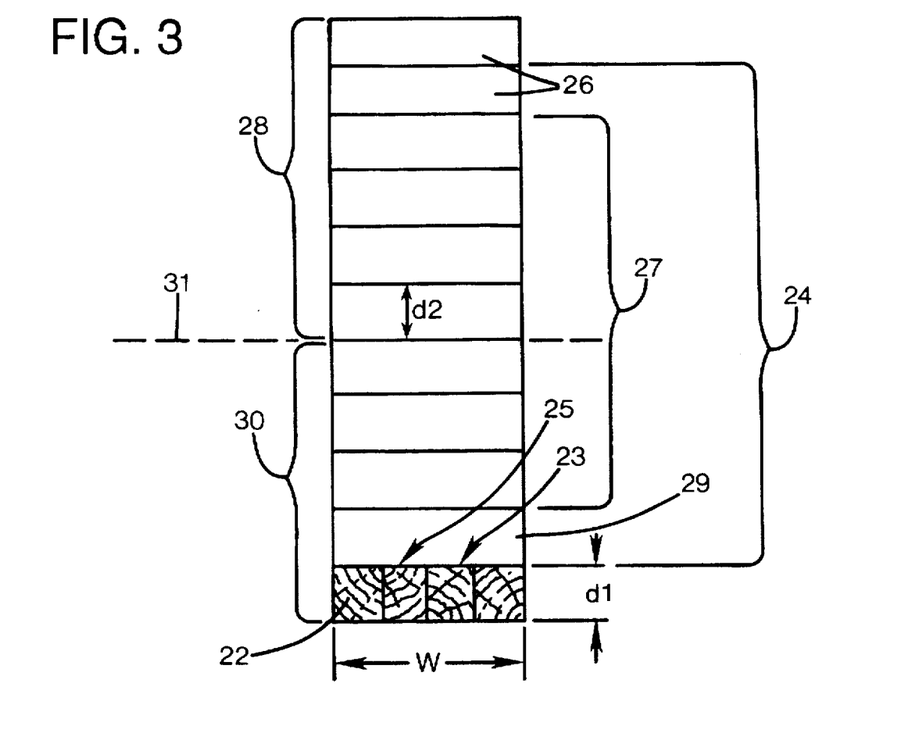
FIG. 3 is an end view of a wood body having stock pieces attached to the bottom thereof.

In the preferred embodiment, the planed surface 25 of the stock piece 22 may be glued to the wood body 24 by using an adhesive such as an emulsion polymer isocyanate or phenol resorcinol-based adhesive. In this way, the stock piece 22 provides reinforcement to the wood body 24. If a relatively thin stock piece 22 is used, then a plurality of stock pieces 22 may be used to provide sufficient reinforcement, as discussed in detail below.

The wood body 24 may include a top wood panel 26, intermediate wood panels 27 and a bottom wood panel 29 so that an upper portion of the wood body, including the top wood panel 26 and an upper half of the intermediate wood panels 27, forms a compression zone 28 and a lower portion of the wood body, including a lower half of the intermediate wood panels 27, the bottom wood panel 29 and the stock piece 22, forms a tension zone 30. The compression zone 28 and the tension zone 30 are separated by a neutral plane 31 that is disposed between the two zones. When the wood body 24 is subjected to a load that is perpendicular to the longitudinal direction of the wood body, the wood panels in the tension zone are subjected to tension forces and the wood panels in the compression zone are subjected to compression forces. If the wood body 24 is subjected to a very heavy load, the wood body may fail in the tension zone 30 or in the compression zone 28. A failure in the compression zone 28 is often benign but a failure in the tension zone 30 can be catastrophic. It is therefore advantageous to provide reinforcement to the tension zone 30 of the wood body 24 to reduce the risk of failure in the tension zone 30. It may also be important to reinforce the compression zone 28 of the wood body 24. The stock piece 22 may therefore be attached to the bottom wood panel 29 of the wood body 24.

As mentioned above, the tension zone 30 may include a plurality of wood panels and one or more laminated stock pieces 22. It is to be understood that the number and the thickness of the wood panels and sheet materials used in each stock piece may vary with the particular application. The thickness d1 of the stock piece 22 may be greater than a thickness d2 of the wood panels. However, the thickness d1 may also be smaller than the thickness d2.

Figure 4:
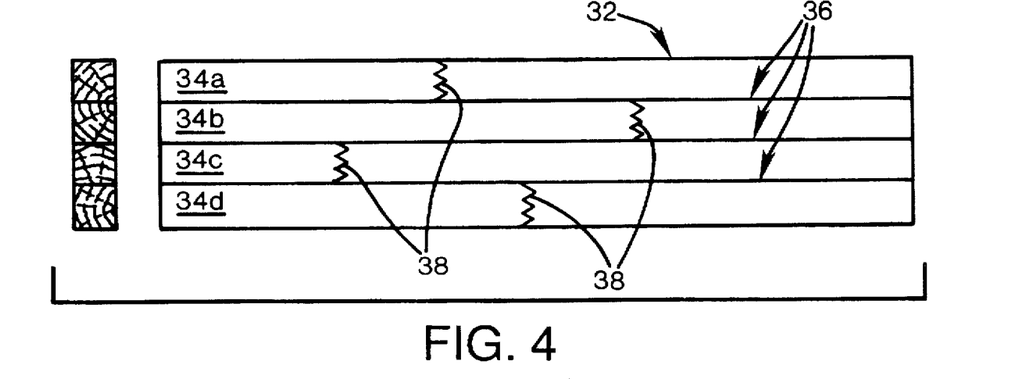
FIG. 4 is a side view of a first stock piece having finger joints defined therein.
Figure 5:
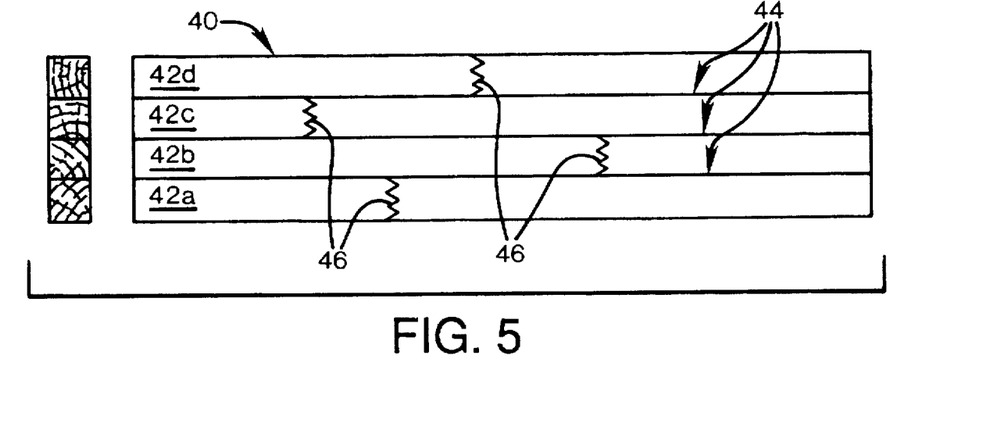
FIG. 5 is a side view of a second stock piece having finger joints defined therein.

Alternative embodiments of stock pieces of the present invention are shown in FIGS. 4 and 5. Instead of using one laminated reinforced stock piece that is attached or glued to the wood body 24, a plurality of laminated stock pieces that are glued together may be used. A first laminated stock piece 32 is shown in FIG. 4. Similar to the stock piece 22, the stock piece 32 includes a plurality of wood members 34a–d having fiber reinforced polymer composite sheet materials 36 placed therebetween. The stock piece 32 may include a plurality of finger joints 38 that are weak spots in the wood members 34.

A second laminated stock piece 40 is shown in FIG. 5. The stock piece 40 is substantially similar to the stock piece 32. The stock piece 40 includes a plurality of wood members 42a–d having fiber reinforced polymer composite sheet materials 44 placed therebetween. The stock piece 40 may also include finger joints 46.

Figure 6:
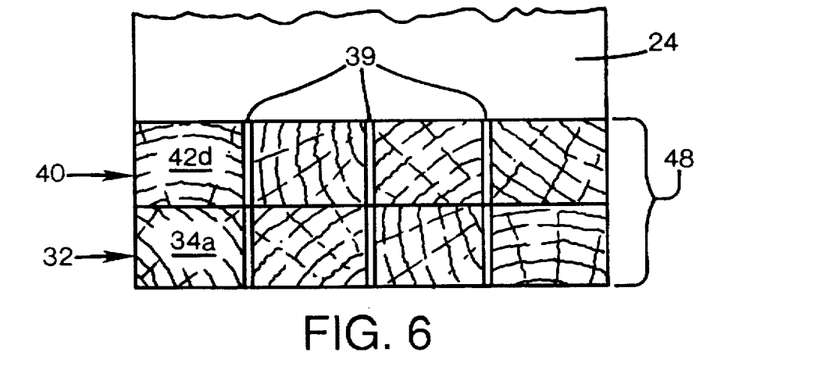
FIG. 6 is an end view of the first stock piece attached to the second stock piece.

It is desirable to distribute any existing finger joints within the wood body 24 and the stock pieces because the finger joints are weak spots and a failure is likely to occur at any existing finger joints when the wood body and the stock pieces are exposed to heavy load forces because stress concentrations often occur at the finger joints. As shown in FIG. 6, the stock piece 32 may be adhered to the stock piece 40 so that the stock piece 40 is positioned in an inverted position relative to the stock piece 32. For example, the wood panel 42d may be stacked on top of wood panel 34a to prevent the finger joints 38 and 46 from being immediately adjacent and stacked on top of one another and so that areas of potential stress concentration at the finger joints are distributed within the wood piece. In this way, a multiple laminated stock piece assembly 48 may be formed including the inverted stock piece 40 attached to or glued to the laminated stock piece 32. Similar to the above described embodiments, the stock piece assembly 48 includes a plurality of fiber reinforced composite sheet materials 39, as best shown in FIG. 6. The stock piece assembly 48 may then be attached to the bottom or to top of the wood body 24. It is to be understood, that more than two laminated stock pieces may be stacked on top of one another in this manner while ensuring that any existing finger joints are not concentrated within the stock pieces.

Figure 7:
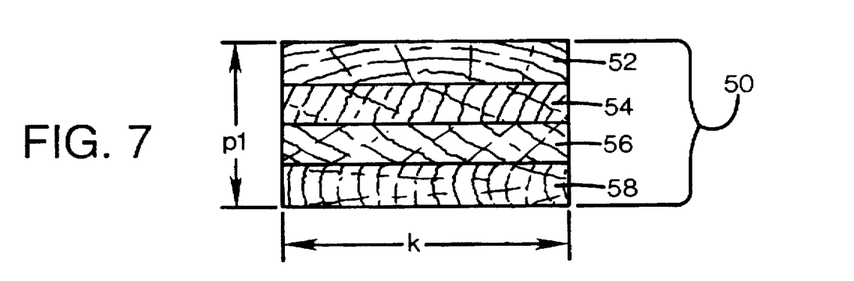
FIG. 7 is an end view of a wood stock.
Figure 8:
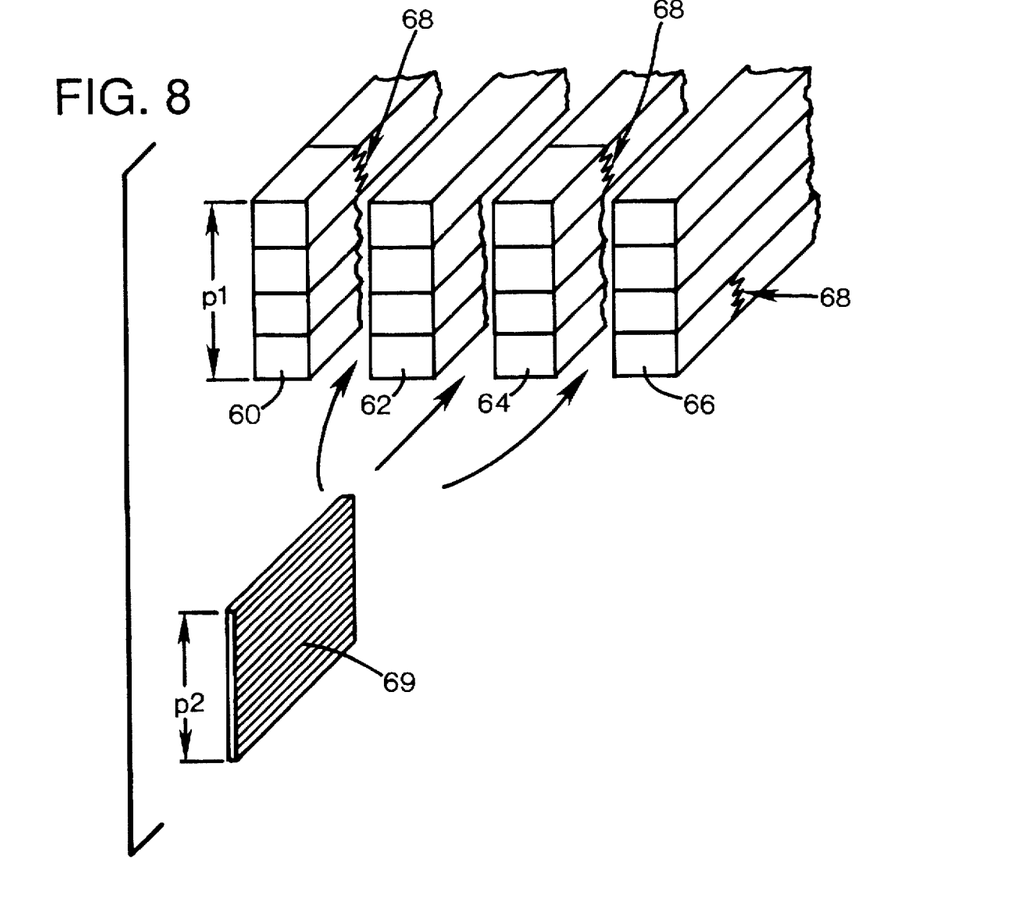
FIG. 8 is a side view of a plurality of stock pieces.

FIGS. 7 and 8 show an alternative embodiment of a reinforced wood piece of the present invention. A laminated wood stock 50 includes wood members 52, 54, 56, and 58 stacked on top of one another. The wood stock 50 may have a width k and a depth p1. The wood stock 50 may be vertically cut into stock pieces 60, 62, 64 and 66. The stock pieces may include finger joints 68. The stock pieces are arranged so that any existing finger joints are distributed as described above. Fiber reinforced composite sheet materials 69 may then vertically placed between and glued to the stock pieces so that the stock pieces are separated by the sheet materials and the sheet materials have a depth p2 that is substantially similar to the depth p1 of the stock pieces. The preferred fibers, resin matrix, glue, strips and wood material are the same as above.

Figure 9:
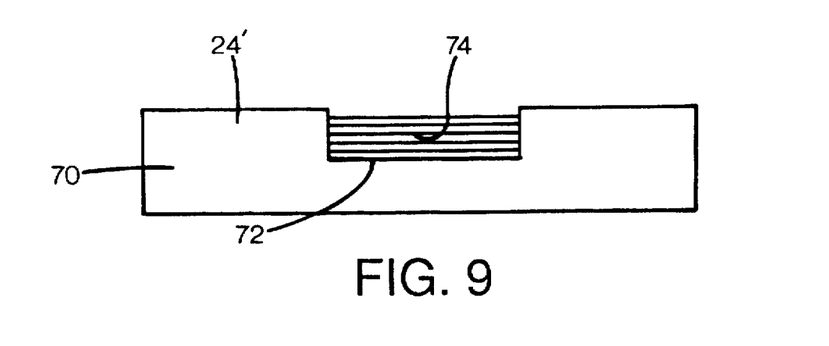
FIG. 9 is a side view of a top wood panel having a cavity formed therein.

An alternative embodiment of the present invention is shown in FIG. 9 wherein the wood body 24' includes a top wood panel 70 having a cavity 72 defined therein to receive a plurality of fiber reinforced composite sheet materials or fiber bundles 74 to reinforce the compression zone of the beam stock. The sheet materials or bundles of fiber reinforcements 74 are attached to the wood panel 70 to provide extra strength to the compression zone of the wood body. In this embodiment, the sheet materials or fiber bundles are parallel to the neutral plane (not shown).

Figure 10:
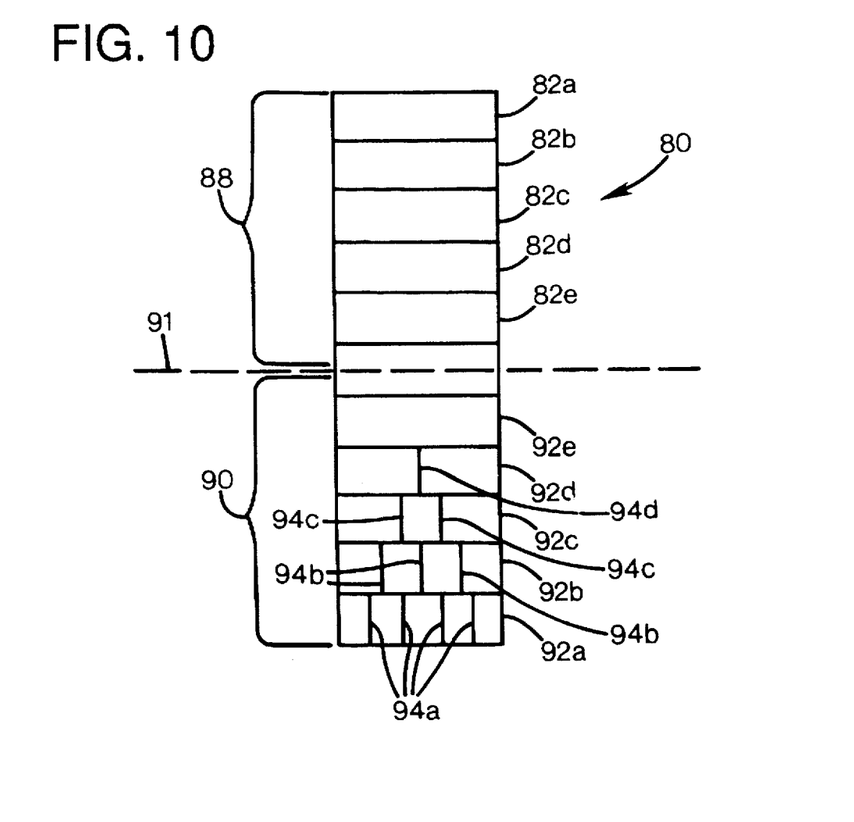
FIG. 10 is an end view of an alternative embodiment of a wood piece of the present invention.

FIG. 10 shows yet another alternative embodiment of the present invention. A wood piece 80 includes a plurality of compression zone wood panels 82a–82e. The wood piece 80 has a tension zone 90 that is disposed below the compression zone 88 so that the compression zone 88 and the tension zone 90 are divided by a neutral plane 91. The tension zone 90 of the wood piece 80 includes a plurality of wood panels 92a–e. The amount of reinforcement provided can be adjusted by varying the number of sheet materials/fiber bundles or the volume of reinforcement used. In other words, if extra reinforcement is required, the number of sheet materials and/or fiber bundles may be increased or more reinforcing fibers may be used in each sheet material or fiber bundle.

The wood piece 80 has a bottom wood panel 92a having at least four fiber reinforced composite sheet materials 94a disposed therein. A first intermediate wood panel 92b is stacked on top of the wood panel 92a and glued thereto. The wood panel 92b has at least three fiber reinforced sheet materials 94b disposed therein. A wood panel 92c is stacked on top the wood panel 92b and has at least two fiber reinforced composite sheet materials 94c disposed therein. A wood panel 92d is stacked on top of wood panel 92c and attached thereto. The wood panel 92d has at least one fiber reinforced composite sheet material 94d disposed therein so that the sheet materials 94 form the shape of a triangle as seen in FIG. 10. The sheet materials 94a–d are preferably perpendicular to the neutral plane 91 of the wood piece 80. It is to be understood that more or fewer sheet materials may be used. It is desirable to provide the bottom wood panel with the most reinforcement because the bottom wood panel is subjected to the highest tensile forces when the wood piece is exposed to a load.

While the present invention has been described in accordance with preferred embodiments, it is to be understood that certain substitutions and alterations may be made thereto without departing from the spirit and scope of the following claims.

We claim:

1. A method of preparing a reinforced wood piece, comprising the steps of:

providing a first wood member;

providing a second wood member;

providing a fiber reinforced polymer composite sheet material;

providing a wood body having a tension zone and a compression zone so that a neutral plane is disposed between the tension zone and the compression zone;

attaching the fiber reinforced polymer composite sheet material to the first and second wood members to form a laminated wood stock so that the wood members and the fiber reinforced polymer composite sheet material are intermittently stacked on top of one another;

cutting the laminated wood stock into a plurality of laminated stock pieces; and attaching at least one laminated stock piece to the wood body so that the fiber reinforced polymer composite sheet material of the laminated stock piece is perpendicular to the neutral plane.

2. The method according the claim 1 wherein the step of providing a wood body includes providing a laminated wood body having a first and a second wood panel stacked on top of one another so that the first wood panel is in the compression zone and the second wood panel is in the tension zone.

3. The method according to claim 1 wherein the step of cutting the laminated wood stock includes the step of cutting the laminated wood stock into a first and a second laminated stock piece, and the step of attaching at least one laminated stock piece includes the step of attaching the first laminated stock piece to the wood body so that the fiber reinforced polymer composite sheet material is perpendicular to the neutral plane of the wood body and attaching the second laminated stock piece to the first laminated stock piece.

4. The method according to claim 3 wherein the first and second laminated stock pieces include finger joints and the step of attaching the second laminated stock includes the step of positioning the second laminated stock piece relative to the first laminated stock piece so that the finger joints of the first laminated stock piece are remote from the finger joints of the second laminated stock piece.

5. The method according to claim 1 wherein the step of providing a wood body includes the step of providing a laminated wood body having a top wood panel having a cavity formed therein and the step of attaching the fiber reinforced polymer composite sheet material includes placing the fiber reinforced polymer composite sheet material in the cavity.

6. The method according to claim 2 wherein the step of attaching at least one laminated stock piece to the laminated wood body includes providing a first laminated stock piece having a fiber reinforced polymer composite sheet material disposed therein and gluing the first laminated stock piece to a bottom of the laminated wood body and providing a second laminated stock piece having two spaced apart fiber reinforced polymer composite sheet materials disposed therein and gluing the second laminated stock piece to the first laminated stock piece so that the fiber reinforced polymer composite sheet materials of the first and the second laminated stock pieces are perpendicular to the wood panels of the laminated wood body.

7. The method according to claim 1 wherein the step of attaching at least one laminated stock piece to the wood body includes providing a first and a second stock piece and gluing the first stock piece to the wood body and gluing the second stock piece to the first stock piece.

8. The method according to claim 7 wherein the step of gluing the second stock piece to the first stock piece includes positioning the second stock piece relative to the first stock piece so that the finger joints of the first stock piece are remote from the finger joints of the second stock piece.

9. The method according to claim 1 wherein the step of attaching includes the step of attaching the laminated stock piece to the wood body in the tension zone thereof.

10. The method according to claim 1 wherein the step of attaching includes the step of attaching the laminated stock piece to the wood body in the compression zone thereof.

11. The method according to claim 2 wherein the step of attaching at least one laminated stock piece to the laminated wood body includes providing a first laminated stock piece having a fiber reinforced polymer composite sheet material disposed therein and gluing the first laminated stock piece to a top of the laminated wood body and providing a second laminated stock piece having two spaced apart fiber reinforced polymer composite sheet materials disposed therein and gluing the second laminated stock piece to the first laminated stock piece so that the fiber reinforced polymer composite sheet materials of the first and the second laminated stock pieces are perpendicular to the wood panels of the laminated wood body.

12. A method of preparing a reinforced wood piece, comprising the steps of:

providing a first wood member having a first finger joint;

providing a second wood member having a second finger joint;

providing a fiber reinforced polymer composite sheet material;

providing an elongate wood body having a plurality of wood panels;

arranging the first wood member relative to the second wood member so that the first finger joint of the first wood member is remote from the second finger joint of the second wood member; and attaching the fiber reinforced polymer composite sheet material to the first and second wood members to form a stock piece so that the wood members and the fiber reinforced polymer composite sheet material are intermittently stacked on top of one another; and attaching the stock piece to the elongate wood body so that the fiber reinforced polymer composite sheet material is perpendicular to the wood panels of the wood body.

13. The method according to claim 12 wherein the step of attaching the fiber reinforced polymer composite sheet material includes the step of gluing the fiber reinforced polymer composite sheet material between the first and second wood members so that the fiber reinforced polymer composite sheet material is disposed therebetween.

14. A method of preparing a reinforced wood piece, comprising the steps of:

providing a first wood member;

providing a second wood member;

providing a fiber reinforced polymer composite sheet material;

providing a wood body;

attaching the fiber reinforced polymer composite sheet material to the first and second wood members to form a laminated wood stock, the first wood member having first finger joints formed therein and the second wood member having second finger joints formed therein, the first finger joints being remote from the second finger joints when the first and second wood members and the fiber reinforced polymer composite sheet material form the laminated wood stock;

cutting the laminated wood stock into a plurality of laminated stock pieces; and attaching at least one laminated stock piece to the wood body.

15. A method of preparing a reinforced glue laminated wood, comprising the steps of:

providing a first wood member having a first finger joint;

providing a second wood member having a second finger joint;

providing tension zone fiber reinforced polymer composite sheet material having a plurality of elongate strips disposed therein;

providing a wood body including a top wood panel, a bottom wood panel and a plurality of intermediate wood panels placed therebetween so that the wood panels are stacked on top of one another, the wood body having a tension zone and a compression zone separated by a neutral plane, the wood body having a bottom that is adjacent the tension zone and a top adjacent the compression zone;

arranging the first wood member relative the second wood member so that the first finger joint is remote from the second finger joint;

placing the tension zone fiber reinforced polymer composite sheet material between the first and second wood member so that the wood members are separated by the tension zone fiber reinforced polymer composite sheet material;

adhering the tension zone fiber reinforced polymer composite sheet material to the first and second wood member to form a glue laminated wood stock comprising wood members intermittently placed between the tension zone fiber reinforced polymer composite sheet material;

cutting through the wood members and the elongate strips of the tension zone fiber reinforced polymer composite sheet material of the glue laminated wood stock into first and second laminated stock pieces;

gluing the first laminated stock piece to the bottom of the wood body so that the tension zone fiber reinforced polymer composite sheet material of the laminated stock piece is perpendicular to the neutral plane of the wood body;

positioning the second laminated stock piece relative to the first laminated stock piece so that the finger joints of the first laminated stock piece are remote of the finger joints of the second laminated stock piece; and gluing the second laminated stock piece to the first laminated stock piece.

16. A reinforced wood piece comprising:

an elongate laminated wood body having a first wood panel attached to a second wood panel so that a neutral plane is disposed between the first wood panel and the second wood panel; and a laminated stock piece attached to the laminated wood body, the laminated stock piece including a plurality of wood members and fiber reinforced polymer composite sheet materials that are intermittently disposed so that the wood members are separated by the fiber reinforced polymer composite sheet materials, the fiber reinforced polymer composite sheet materials being perpendicular to the neutral plane of the laminated wood body.

17. The reinforced wood piece according to claim 16 wherein the laminated stock piece is glued to the laminated wood body with a phenol resorcinol based resin system.

18. The reinforced wood piece according to claim 16 wherein the laminated stock piece is attached to a bottom of the wood body.

19. The reinforced wood piece according to claim 17 wherein the adhesive includes emulsion polymer isocyanate.

20. The reinforced wood piece according to claim 16 wherein the laminated stock piece is a laminated stock assembly attached to the wood body, the laminated stock assembly comprises first and second laminated stock pieces, each laminated stock piece includes a plurality of wood members and fiber reinforced polymer composite sheet materials that are intermittently attached to one another, the first and second laminated stock pieces have finger joints, the first laminated stock piece is attached to the wood body so that the fiber reinforced polymer composite sheet materials are perpendicular to the first and second wood panels, the second laminates stock piece is attached to the first laminated stock piece so that the finger joints of the first laminated stock piece are remote from the finger joints of the second laminated stock piece.

21. The reinforced wood piece according to claim 20 wherein the laminated stock assembly is attached to a bottom of the wood body.

22. The reinforced wood piece according to claim 20 wherein the laminated stock assembly is attached to a top of the wood body.

23. The reinforce wood piece according to claim 16 wherein the first wood panel has a cavity formed therein.

24. The reinforced wood piece according to claim 23 wherein the cavity is an elongate groove extending from one end of the first wood panel to an opposite end of the first wood panel.

25. The reinforced wood piece according to claim 20 wherein the wood body includes a first wood panel, a second wood panel attached to the first wood panel, a third wood panel attached to the second wood panel, a fourth wood panel attached to the third wood panel and the laminated stock assembly, the third wood panel includes one tension zone fiber reinforced polymer composite sheet material disposed therein and the fourth wood panel includes at least two tension zone fiber reinforced polymer composite sheet materials.

\* \* \* \* \*